United States Patent
Foti

(10) Patent No.: US 11,218,519 B2
(45) Date of Patent: Jan. 4, 2022

(54) SERVICE BASED P-CSCF DISCOVERY

(71) Applicant: Telefonaktiebolaget LM Ericsson (publ), Stockholm (SE)

(72) Inventor: George Foti, Dollard des Ormeaux (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/965,673

(22) PCT Filed: Feb. 1, 2019

(86) PCT No.: PCT/IB2019/050834
§ 371 (c)(1),
(2) Date: Jul. 29, 2020

(87) PCT Pub. No.: WO2019/150324
PCT Pub. Date: Aug. 8, 2019

(65) Prior Publication Data
US 2021/0044628 A1 Feb. 11, 2021

Related U.S. Application Data

(60) Provisional application No. 62/625,554, filed on Feb. 2, 2018.

(51) Int. Cl.
*H04L 29/06* (2006.01)
*H04L 29/08* (2006.01)

(52) U.S. Cl.
CPC ...... *H04L 65/1069* (2013.01); *H04L 67/1004* (2013.01); *H04L 67/1025* (2013.01);
(Continued)

(58) Field of Classification Search
CPC ............. H04L 65/1069; H04L 67/1004; H04L 67/16; H04L 65/1016
See application file for complete search history.

(56) References Cited

U.S. PATENT DOCUMENTS

| | | | |
|---|---|---|---|
| 8,230,073 B1* | 7/2012 | Leeder | H04L 65/1063 709/227 |
| 8,423,652 B2* | 4/2013 | Leeder | H04L 65/1016 709/227 |

(Continued)

FOREIGN PATENT DOCUMENTS

WO   2017026772 A1   2/2017

OTHER PUBLICATIONS

Doolin, Kevin, et al. "Context-aware multimedia services in a pervasive environment: the Daidalos approach." AMBI-SYS. 2008.*
(Continued)

*Primary Examiner* — Jimmy H Tran
(74) *Attorney, Agent, or Firm* — Coats & Bennett, PLLC

(57) ABSTRACT

The present disclosure enables a UE (100) to discover a P-CSCF (85) in the IMS network based on the services offered by the P-CSCF or the area served by the P-CSCF (85) when it establishes a data session. The P-CSCF (85) registers with a discovery node (70) in the wireless communication network (10) and provides relevant information about the P-CSCF (85) to the discovery node (70), such as the type of services provided, its network address and/or FQDN, a list of cells supported, and a list of tracking areas supported. When a request is received to establish a session with the IMS for a UE, the SMF (45) in the wireless communication network (10) queries the discovery node (70) to fetch the P-CSCF (85) information and forwards the P-CSCF information to the requesting UE. The UE (100) selects a P-CSCF (85) to use when it initiates IMS registration.

23 Claims, 15 Drawing Sheets

(52) U.S. Cl.
CPC .............. *H04L 67/16* (2013.01); *H04L 67/18* (2013.01); *H04L 65/1016* (2013.01)

(56) References Cited

U.S. PATENT DOCUMENTS

| | | | |
|---|---|---|---|
| 2006/0291412 A1* | 12/2006 | Naqvi | H04W 48/16 370/328 |
| 2007/0088836 A1* | 4/2007 | Tai | H04L 67/16 709/227 |
| 2009/0191870 A1* | 7/2009 | Siegel | H04W 4/029 455/435.1 |
| 2012/0215930 A1* | 8/2012 | Stenfelt | H04L 65/1016 709/228 |
| 2012/0265886 A1* | 10/2012 | Leeder | H04L 65/1046 709/227 |
| 2012/0281621 A1* | 11/2012 | Lotfallah | H04L 65/1016 370/328 |
| 2015/0043429 A1* | 2/2015 | Kim | H04L 67/18 370/328 |
| 2015/0195864 A1* | 7/2015 | Bartolome Rodrigo | H04L 65/1073 370/221 |
| 2015/0201320 A1* | 7/2015 | Narkar | H04L 67/1002 370/328 |
| 2016/0380802 A1* | 12/2016 | Kunz | H04L 69/40 370/216 |
| 2018/0048681 A1* | 2/2018 | Chiang | H04L 41/0668 |
| 2018/0139289 A1* | 5/2018 | Huotari | H04L 67/16 |
| 2018/0234465 A1* | 8/2018 | Kim | H04L 61/2015 |
| 2018/0368050 A1* | 12/2018 | Chun | H04W 36/0022 |
| 2020/0367303 A1* | 11/2020 | Naqvi | H04W 76/15 |
| 2021/0014769 A1* | 1/2021 | Jahangir | H04L 61/203 |

OTHER PUBLICATIONS

Häber, Andreas. "Remote service discovery and control for ubiquitous service environments in next-generation networks." (2010).*

De, Suparna, and Klaus Moessner. "Context gathering in ubiquitous environments: enhanced service discovery." 3rd Workshop on Context Awareness for Proactive Systems (CAPS'2007) Proceedings. 2007.*

Hodes, Todd D., et al. "An architecture for secure wide-area service discovery." Wireless Networks 8.2 (2002): 213-230.*

Ververidis, Christopher N., and George C. Polyzos. "Service discovery for mobile ad hoc networks: a survey of issues and techniques." IEEE Communications Surveys & Tutorials 10.3 (2008): 30-45.*

* cited by examiner

SERVICE BASED P-CSCF DISCOVERY

TECHNICAL FIELD

The present invention relates generally to delivery of multimedia services to user equipment (UE) over a wireless communication network and, more particularly to, service discovery in multimedia delivery network.

BACKGROUND

The Internet Protocol (IP) Multimedia Subsystem (IMS) is a core network that delivers multimedia services to users over any type of access network. Mobile devices, known as user equipment (UEs), can connect to the IMS over wireless communication networks. In order to receive multimedia services via the IMS, a UE connects to a Proxy Call State Control Function (P-CSCF), which serves as the entry point to the IMS domain. The UE attaches to the P-CSCF prior to performing IMS registrations and initiating IMS sessions.

With the advent of Fifth Generation (5G) networks, also known as New Radio (NR) networks, it is expected that the P-CSCF will become more specialized to support certain services and may even be location dependent. More specialized P-CSCFs may be advantageous, for example, to support future trends in mobile edge computing, network slicing, etc.

To connect to the IMS, a UE performs a connection establishment procedure to establish a Packet Data Network (PDN) connection over a Fourth Generation (4G) network or a Protocol Data Unit (PDU) session over a Fifth Generation (5G) network. During the connection establishment procedure, a list of P-CSCFs is returned to the UE and the UE selects a P-CSCF from the returned list. Typically, the list of P-CSCFs that are returned to the UE are statically configured in the network and contain no service information or location information. Currently, there is no way for a UE to discover and/or select a P-CSCF based on the services offered by the P-CSCF or the area served by the P-CSCF.

SUMMARY

The present disclosure enables a UE to discover a P-CSCF in the IMS network based on the services offered by the P-CSCF or the area served by the P-CSCF when it establishes a data session. The P-CSCF registers with a network function (NF) discovery node in the wireless communication network and provides relevant information about the P-CSCF to the NF discovery node, such as the type of services provided, its network address and/or fully qualified domain name (FQDN), a list of cells supported, and a list of tracking areas supported. When a request is received to establish a session with the IMS for a UE, the session management function (SMF) in the wireless communication network queries the NF discovery node to fetch the P-CSCF information and forwards the P-CSCF information to the requesting UE. The UE selects a P-CSCF to use when it initiates IMS registration.

In some embodiments, the UE indicates the type of services it desires in a setup request sent to the network. The SMF may include the type of services in the query sent to the NF discovery node as a filtering criteria. The NF discovery node will in this case return P-CSCF information for P-CSCFs that meet the filtering criteria. The query sent to the NF discovery node may include other filtering criteria, such as location information. The location information may comprise an identity of one or more of a service area, a tracking area, or a cell.

In some embodiments, the SMF may filter the P-CSCF information received from the NF discovery node. For example, the SMF could filter the P-CSCF information to exclude information for P-CSCFs that don't support the current tracking area where the UE is registered. As another example, the SMF could filter the P-CSCF information to include information for P-CSCFs that provide the services indicated by the UE in the setup request.

One aspect of the disclosure comprises methods implemented by a SMF in a core network. The SMF receives a request to establish a session used by a UE to communicate with an external data network (e.g. IMS). Responsive to the request, the SMF sends a discovery request to a NF discovery node or other network function discovery node within the wireless communication network for one or more candidate servers in the external data network. The SMF receives, responsive to the discovery request, a list of the candidate servers in the external data network from the NF discovery node. The list of candidate servers returned by the NF discovery node may include, in addition to the identities of the P-CSCFs, any information stored by the NF discovery node such as the services offered by the P-CSCFs and the areas served by the P-CSCFs. The SMF provides the identities (e.g., network addresses or FQDNs) of one or more of the candidate servers from the list to the UE, and establishes a data session used by the UE to communicate with a selected one of the candidate servers in the external data network.

Other embodiments of the disclosure comprise an SMF in a wireless communication network configured to perform the method of the preceding paragraph. In one embodiment, the SMF comprises an interface circuit for communicating with other network nodes in the wireless communication network and a processing circuit. The processing circuit is configured to receive a request to establish a session used by a UE to communicate with an external data network (e.g. IMS). The processing circuit is configured to send, responsive to the request, a discovery request to a NF discovery node or other network function discovery node within the wireless communication network for one or more candidate servers in the external data network. The processing circuit is configured to receive, responsive to the discovery request, a list of the candidate servers in the external data network from the NF discovery node. The list of candidate servers returned by the NF discovery node may include, in addition to the identities of the P-CSCFs, any information stored by the NF discovery node such as the services offered by the P-CSCFs and the areas served by the P-CSCFs. The processing circuit is configured to provide the identities (e.g., network addresses or FQDNs) of one or more of the candidate servers from the list to the UE, and establishes a data session used by the UE to communicate with a selected one of the candidate servers in the external data network Another aspect of the disclosure comprises methods implemented by a NF discovery node in a core network. In one embodiment, the NF discovery node stores a list of available servers in the external data network. The NF discovery node further receives a discovery request from a SMF or other network node in the wireless communication network to identify one or more candidate servers in the external data network. In response to the discovery request, the NF discovery node sends, to the SMF in a discovery response, a list of the candidate servers in the external data network selected from the available servers. The list of candidate servers returned by the NF discovery node may include, in addition to the identities of the P-CSCFs, any information stored by the NF discovery node such as the services offered by the P-CSCFs and the areas served by the P-CSCFs.

Other aspects of the disclosure comprise an NF discovery node in a wireless communication network configured to perform the method of the preceding paragraph. In one embodiment, the NF discovery node comprises an interface circuit for communicating with other network nodes in the wireless communication network and a processing circuit. The processing circuit is configured to store a list of available servers in the external data network. The processing circuit is configured to receive a discovery request from a SMF or other network node in the wireless communication network to identify one or more candidate servers in the external data network. The processing circuit is configured to send, to the SMF in a discovery response, a list of the candidate servers in the external data network selected from the available servers. The list of candidate servers returned by the NF discovery node may include, in addition to the identities of the P-CSCFs, any information stored by the NF discovery node such as the services offered by the P-CSCFs and the areas served by the P-CSCFs.

Another aspect of the disclosure comprises methods implemented by a user equipment in a wireless communication network 10. The UE sends a setup request for a network node to establish a data session (e.g., PDU session) for communicating with the external data network over the wireless communication network 10. The setup request comprises one or more filtering criteria for selecting at least one server in the external data network. Responsive to the setup request, the UE 100 receives a list of one or more candidate servers filtered according to the filtering criteria. The list of candidate servers received by the user equipment may include, in addition to the identities of the P-CSCFs, information such as the services offered by the P-CSCFs and the areas served by the P-CSCFs. The UE establishes a communication session (e.g. IMS session) with a selected one of the candidate servers in the list of candidate servers.

Other aspects of the disclosure comprise a user equipment in a wireless communication network configured to perform the method of the preceding paragraph. In one embodiment, the user equipment comprises an interface circuit for communicating with other network nodes in the wireless communication network and a processing circuit. The processing circuit is configured to send a setup request to a network node to establish a data session (e.g., PDU session) for communicating with the external data network over the wireless communication network 10. The setup request comprises one or more filtering criteria for selecting at least one server in the external data network. The processing circuit is configured to receive a list of one or more candidate servers filtered according to the filtering criteria. The list of candidate servers received by the user equipment may include, in addition to the identities of the P-CSCFs, information such as the services offered by the P-CSCFs and the areas served by the P-CSCFs. The processing circuit is configured to establish a communication session (e.g. IMS session) with a selected one of the candidate servers in the list of candidate servers Another aspect of the disclosure comprises methods implemented by a user equipment in a wireless communication network. The user equipment sends a setup request to a network node to establish a data session for communicating with the external data network over the wireless communication network. The user equipment receives a list of one or more candidate servers in response to the set up request. The list includes, for each candidate server, a type of service provided by the candidate server and/or location information associated with the candidate server. The user equipment establishes a communication session with a selected one of the candidate servers the list of candidate servers.

Other aspects of the disclosure comprise a user equipment in a wireless communication network configured to perform the method of the preceding paragraph. In one embodiment, the user equipment comprises an interface circuit for communicating with other network nodes in the wireless communication network and a processing circuit. The processing circuit is configured to send a setup request to a network node to establish a data session for communicating with the external data network over the wireless communication network. The processing circuit is configured to receive a list of one or more candidate servers in response to the set up request. The list includes, for each candidate server, a type of service provided by the candidate server and/or location information associated with the candidate server. The processing circuit is configured to establish a communication session with a selected one of the candidate servers the list of candidate servers.

Other aspects of the disclosure comprises computer programs comprising executable instructions that, when executed by a processing circuit in a network node or user equipment, causes the network node or user equipment to perform any one of the methods described above. The computer program can be embodied in a carrier such as an electronic signal, optical signal, radio signal, or computer readable storage medium network node.

DETAILED DESCRIPTION

Figure 1:
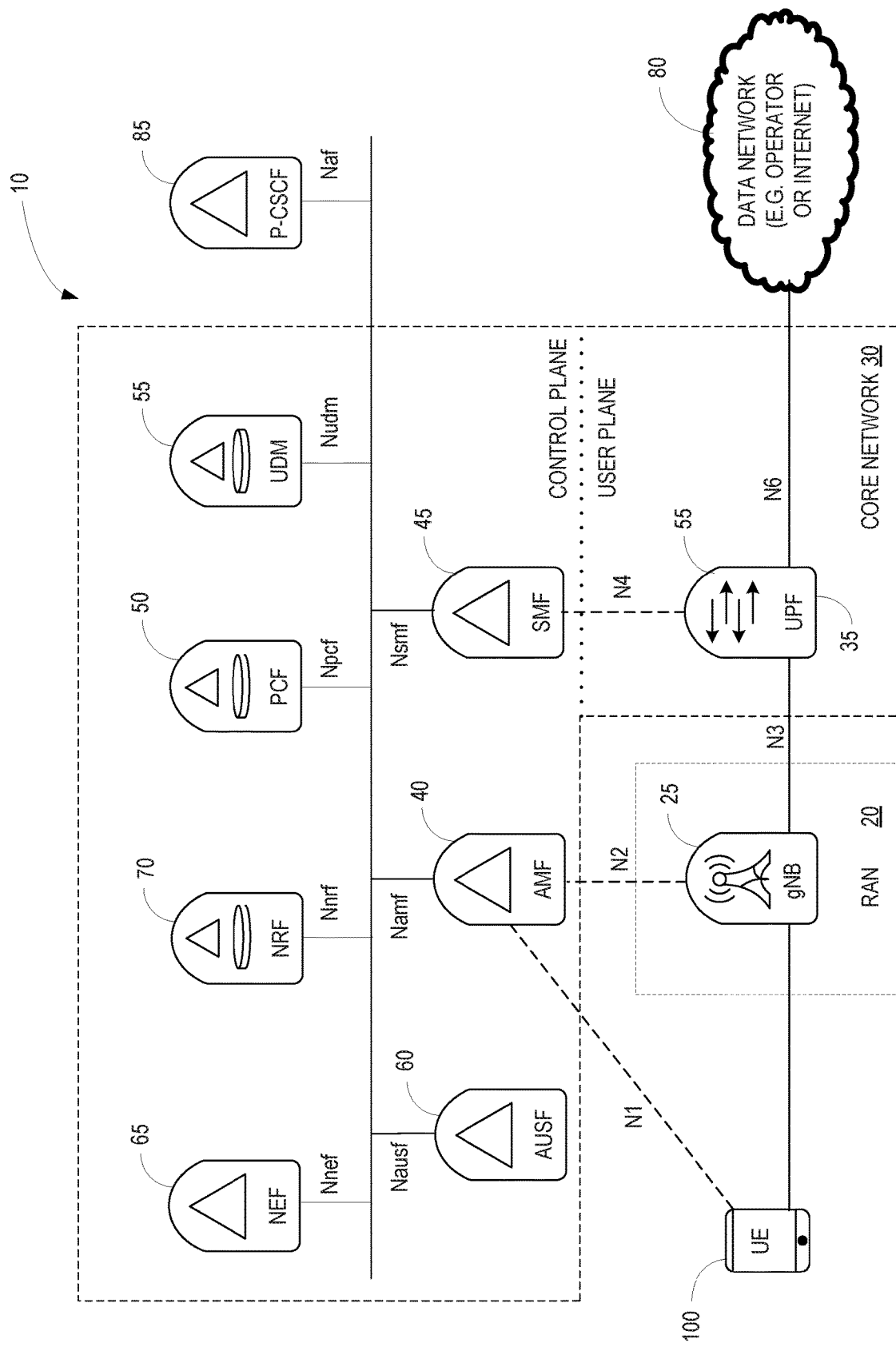
FIG. 1 illustrates a wireless communication network configured to implement the P-CSCF discovery procedures as herein described.

Referring now to the drawings, an exemplary embodiment of the disclosure will be described in the context of a 5G wireless communication network. Those skilled in the art will appreciate that the methods and apparatus herein described are not limited to use in 5G networks, but may also be used in wireless communication networks operating according to other standards.

FIG. 1 illustrates a wireless communication network 10 according to one exemplary embodiment. The wireless communication network 10 comprises a radio access network (RAN) 20 and a core network 30 employing a service based architecture. The RAN 20 comprises one or more base stations 25 providing radio access to UEs 100 operating within the wireless communication network 10. The base stations 25 are also referred to as gNodeBs (gNBs). The core network 30 provides a connection between the RAN 20 and other packet data networks 80, such as the IMS or the Internet.

In one exemplary embodiment, the core network 30 comprises a plurality of network functions (NFs), such as a user plane function (UPF) 35, an access and mobility management function (AMF) 40, a session management function (SMF) 45, a policy control function (PCF) 50, a unified data management (UDM) function 55, a authentication server function (AUSF) 60 and a network exposure function (NEF) 65. These NFs comprise logical entities that reside in one or more core network nodes, which may be implemented by one or more processors, hardware, firmware, or a combination thereof. The functions may reside in a single core network node, or may be distributed among two or more core network nodes.

In conventional wireless communication network, the various NFs (e.g., SMF 45, AMF 40, etc.) in the core network 30 communicate with one another over predefined interfaces. In the services based architecture shown in FIG. 1, instead of predefined interfaces between the control plane functions, the wireless communication network 10 shown in FIG. 1 uses a services model in which the NFs query a NF repository function (NRF) 70 or other NF discovery node to discover and communicate with each other.

In exemplary embodiments of the present disclosure, a P-CSCF 85 in an IMS network is permitted to register with the NRF 70 in the core network 30. By registering with the NRF 70 in the core network 30, the P-CSCF 85 is discoverable to the NFs in the core network 30.

It is assumed for purposes of this discussion that the NRF 70 stores a list of P-CSCFs 85 in the external data network. The list may be stored in a database or other data structure. As one example, the NRF 70 stores the following information for each P-CSCF 85 that registers with the NRF 70:

The P-CSCF information, such as a NF type, an identifier and a data network name (DNN) of the P-CSCF 85.

The fully qualified domain name (FQDN) or network address associated with the P-CSCF 85.

A list of services supported by the P-CSCF 85.

A list of cells served by the P-CSCF 85.

A tracking area (TA) served by the P-CSCF 85.

The list of information provided above is not intended to be an exhaustive listing of the information that can be stored by the NRF 70. The information stored by the NRF 70 can be extended to include additional information. Further, some of the information listed above may be omitted in some embodiments. The information stored by the NRF 70 enables the UE 100 to select a P-CSCF 85 for the service it desires. If the P-CSCF 85 serves a large area, the cell information can be left blank or include some special reserved information equivalent to a blank or null character.

Figure 2:
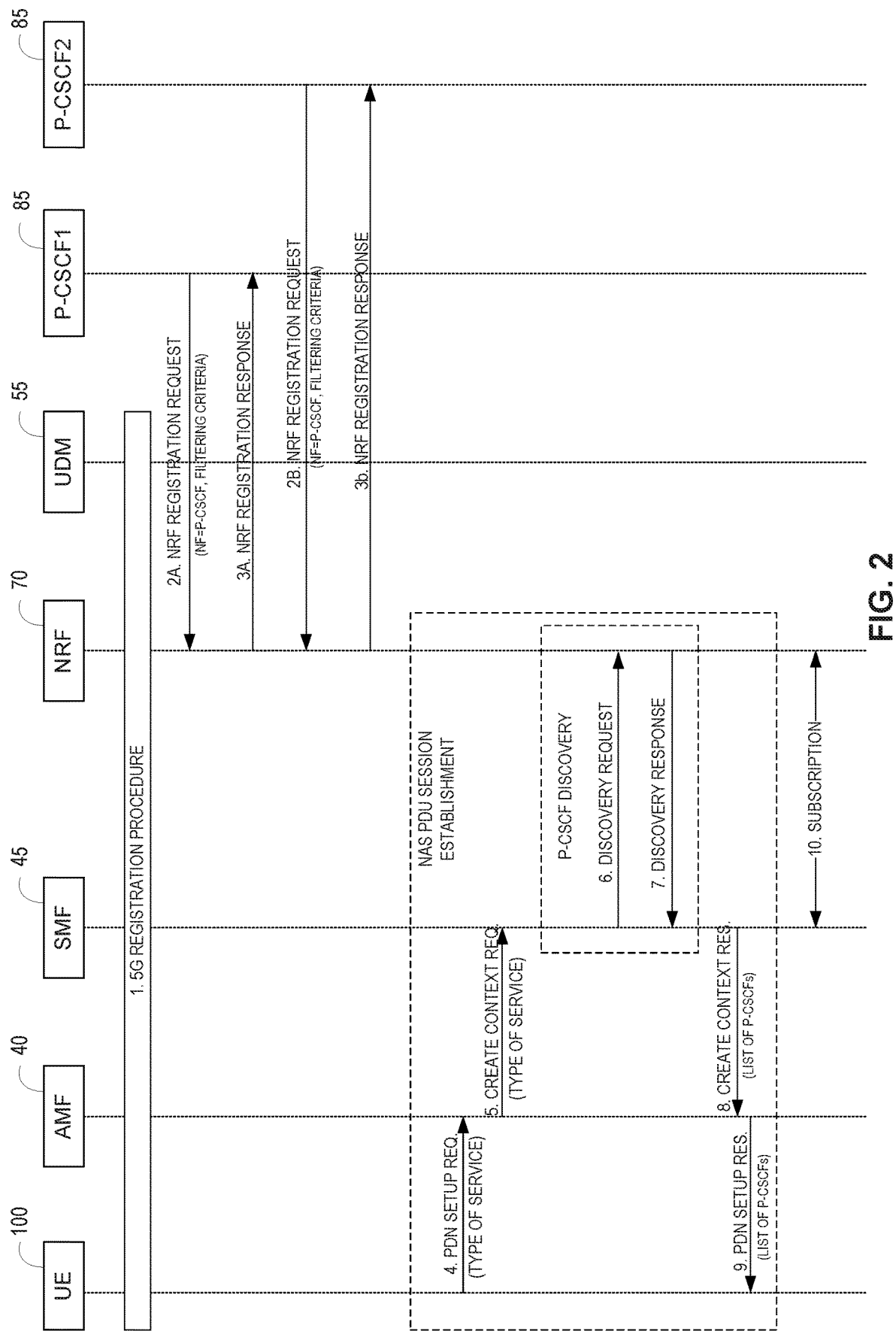
FIG. 2 illustrates a connection establishment procedure that uses a P-CSCF discovery procedure to generate a list of candidate servers.

FIG. 2 illustrates an exemplary procedure for establishing a PDN connection between a UE 100 and a P-CSCF 85 in an IMS network. At step 1, the UE 100 performs a registration procedure to register with the wireless communication network 10 using conventional registration procedures. At step 2A, a first P-CSCF 85, denoted P-CSCF1, sends an NRF registration request to the NRF 70 in the core network 30. The NRF registration message identifies the type of the NF seeking registration (in this case NF=P-CSCF), a list of services supported, the FQDN of the P-CSCF 85, a list of cells served by the P-CSCF 85, and the tracking area served by the P-CSCF 85. The NRF 70 returns a NRF registration response at step 3A indicating whether the registration was successful. Similarly, at step 2B, a second P-CSCF 85, denoted P-CSCF2, registers with the NRF 70. P-CSCF2 sends an NRF registration request to the NRF 70 in the core network 30 as previously described. If the registration is successful, the NRF 70 returns an NRF registration response at step 3B indicating whether the registration was successful. Those in the art will appreciate that the registration by the P. CSCFs 85 with the NRF 70 and the UE registration with the network are performed independently and that registration by the P-CSCFs 85 to the NRF 70 could occur either before or after the UE 100 registration with the network.

When the UE 100 wants to setup a data session for communicating with the external data network, the UE 100 performs a PDU session establishment procedure as described in 3GPP standard TS 23.502, section 4.3.2.2, which is incorporated herein in its entirety by reference. One aspect of the disclosure is the incorporation of a P-CSCF discovery procedure into the otherwise conventional PDU session establishment procedure. For the sake of brevity and clarity, FIG. 2 illustrates the PDU session establishment procedure in simplified form showing the steps necessary for explaining the present disclosure. Reference can be made to TS 23.502, section 4.3.2.2 for a complete sequence of steps involved in the PDU session establishment procedure. At step 4, the UE 100 sends a PDU setup request to the AMF 40 to initiate a PDU session with the IMS. In this example, it is assumed that the PDU setup request is modified to include a type of service desired by the UE 100. Location information or other discovery related information could also be included in the setup request in addition to or in place of the service type. At step 5, the AMF 40 sends a Create Context request to the SMF 45, which is responsible for setting up the PDU session. The Create Context request includes the service type or other discovery related information provided by the UE 100 in the PDU setup request. In conventional systems, the SMF 45 would setup a PDU session over which the UE 100 can communicate with a P-CSCF 85 and return a statically configured list of P-CSCFs 85 to the UE 100. According to an aspect of the present disclosure, the SMF 45 sends, at step 6, a discovery request to the NRF 70 to obtain a list of candidate P-CSCFs 85. The discovery request may include, in addition to the network function (NF=P-CSCF), one or more filtering criteria, such as location information and the type of service requested by the UE 100. The location information may comprise an identity of at least one of a service area, a tracking area and a cell. The location information could also comprise Global Positioning System (GPS) coordinates or other coordinates providing a location of the UE 100. The NRF 70 queries the database to find all P-CSCFs 85 meeting the filtering criteria specified in the discovery request. At step 7, the NRF 70 returns a list of P-CSCFs 85 to the SMF 45 in a NRF discovery response. The list includes the identities of the P-CSCFs 85 and other relevant information provided by the P-CSCF 85 during registration, such as the services provided by the P-CSCF, location information associated with the P-CSCF 85 and a DNN for the P-CSCF. The FQDN or network address of a P-CSCF serves as a P-CSCF identity enabling the UE 100 to communicate directly with the P-CSCF. The SMF 45 uses the list of P-CSCFs 85 returned by the NRF 70 in place of a statically configured list.

The SMF 45 sets up a data session as currently defined. At step 8, the SMF 45 sends a Create Context response to the AMF 40. The Create Context response includes the list of candidate P-CSCFs 85 to be forwarded to the UE 100. The list of P-CSCFs 85 are forwarded by the AMF 40 to the UE 100 in the PDU setup response. The Create Context response and PDU setup response may optionally include the DNN of the external data network. The UE 100 may then select a P-CSCF 85 from the list provided in the PDU setup response when it initiates an IMS session or other communication session with the external data network. Because the FQDN or other P-CSCF identifier is provided in the list of P-CSCFs 85 returned to the UE 100, the UE 100 is able to communicate directly with a selected one of the P-CSCFs 85 in the list of P-CSCFs 85 returned by the SMF 45. At step 10, the SMF 45 can optionally subscribe with the NRF 70 to receive updates to the list of P-CSCFs 85 returned by the NRF 70, or updates on the status of the P-CSCFs 85 on the list. This step can be performed at any time.

In some embodiments, the list of candidate P-CSCFs 85 can be provided in an order of priority from which the UE 100 can select a P-CSCF 85 based on priority. Also, the list of P-CSCFs 85 may include an associated filter criteria for each P-CSCF 85, from which the UE 100 may select a P-CSCF 85 based on the associated filtering criteria.

Figure 3:
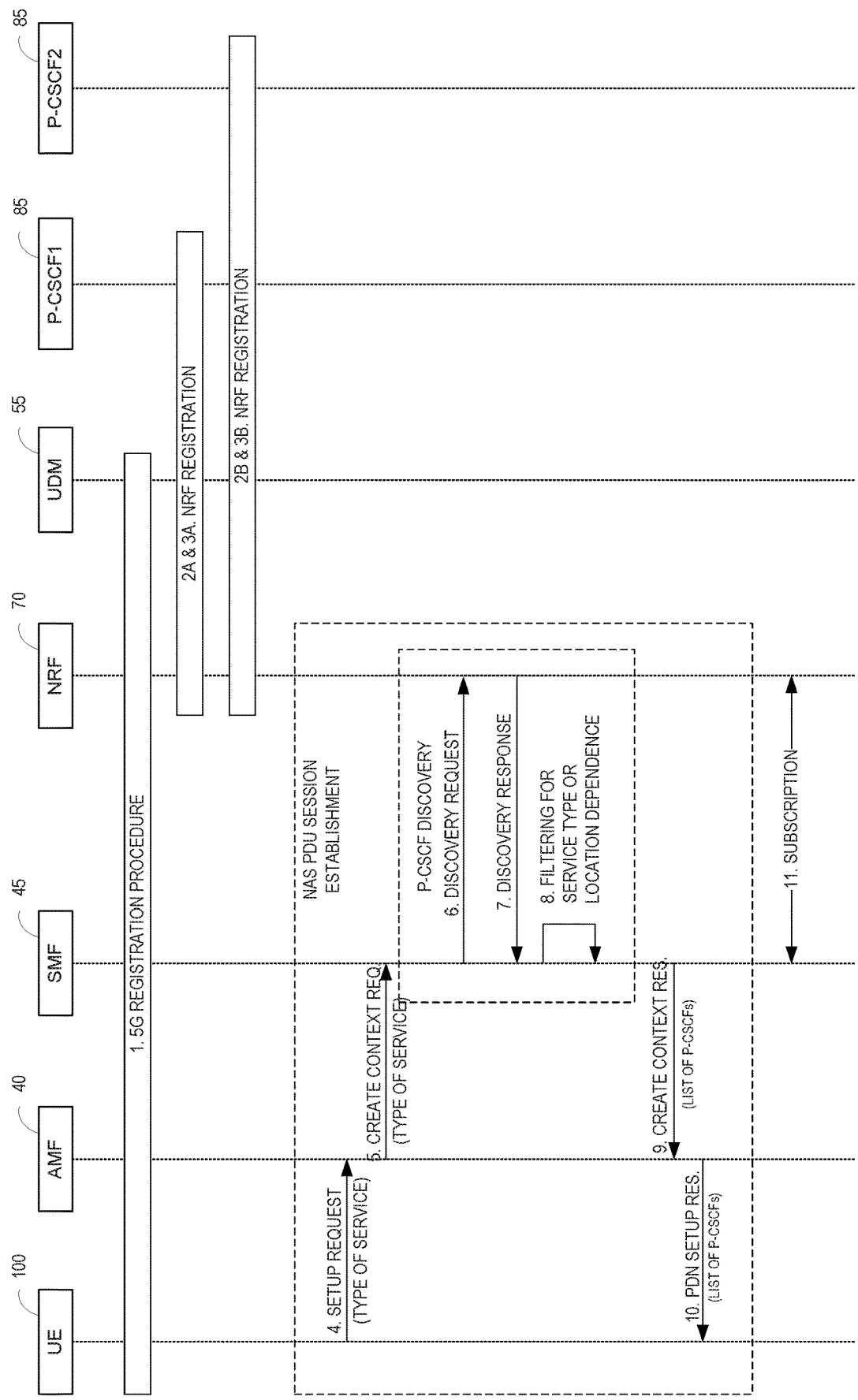
FIG. 3 illustrates another connection establishment procedure that uses a P-CSCF discovery procedure to generate a list of candidate servers.

FIG. 3 illustrates another procedure for establishing a connection with the IMS network that incorporates the P-CSCF 85 discovery procedure. In this procedure, steps 1-5 are the same as previously described. At step 6, the SMF 45 sends a discovery request to the NRF 70. In this embodiment, the SMF 45 does not provide all of the filtering criteria in the discovery request. For example, the SMF 45 may provide location information but not provide a type of service among the filtering criteria. Alternatively, the SMF 45 may provide a type of service without any location information. At step 7, the NRF 70 returns an NRF discovery response including a list of P-CSCFs 85 meeting any filtering criteria provided by the SMF 45. At step 8, the SMF 45 further filters the list of P-CSCFs 85 according to other filtering criteria not provided to the NRF 70. For example, the P-CSCF 85 may return a list of P-CSCFs 85 based on location information provided to it by the SMF 45 and the SMF 45 can filter the list received from the NRF 70 based on a type of service requested by the UE 100. As previously described, the type of service requested by the UE 100 may be indicated by an information element (1E) or some other indication in the PDN setup request. Alternatively, the P-CSCF 85 may return a list of P-CSCFs 85 based on a type of service provided to it by the SMF 45 and the SMF 45 can filter the list received from the NRF 70 based on location information. Filtering for location dependence may be useful to select a P-CSCF for mobile edge computing applications. At step 9, the SMF 45 returns the filtered list of P-CSCFs 85 to the AMF 40 in a Create Context response. The AMF 40 forwards the filtered list to the UE 100 in the PDU setup response at step 10. The UE 100 may then select a P-CSCF 85 from the list provided in the PDU setup response when it initiates an IMS session or other communication session with the external data network. At step 11, the SMF 45 can optionally subscribe with the NRF 70 to receive updates to the list of P-CSCFs 85 returned by the NRF 70, or updates on the status of the P-CSCFs 85 on the list.

Figure 4:
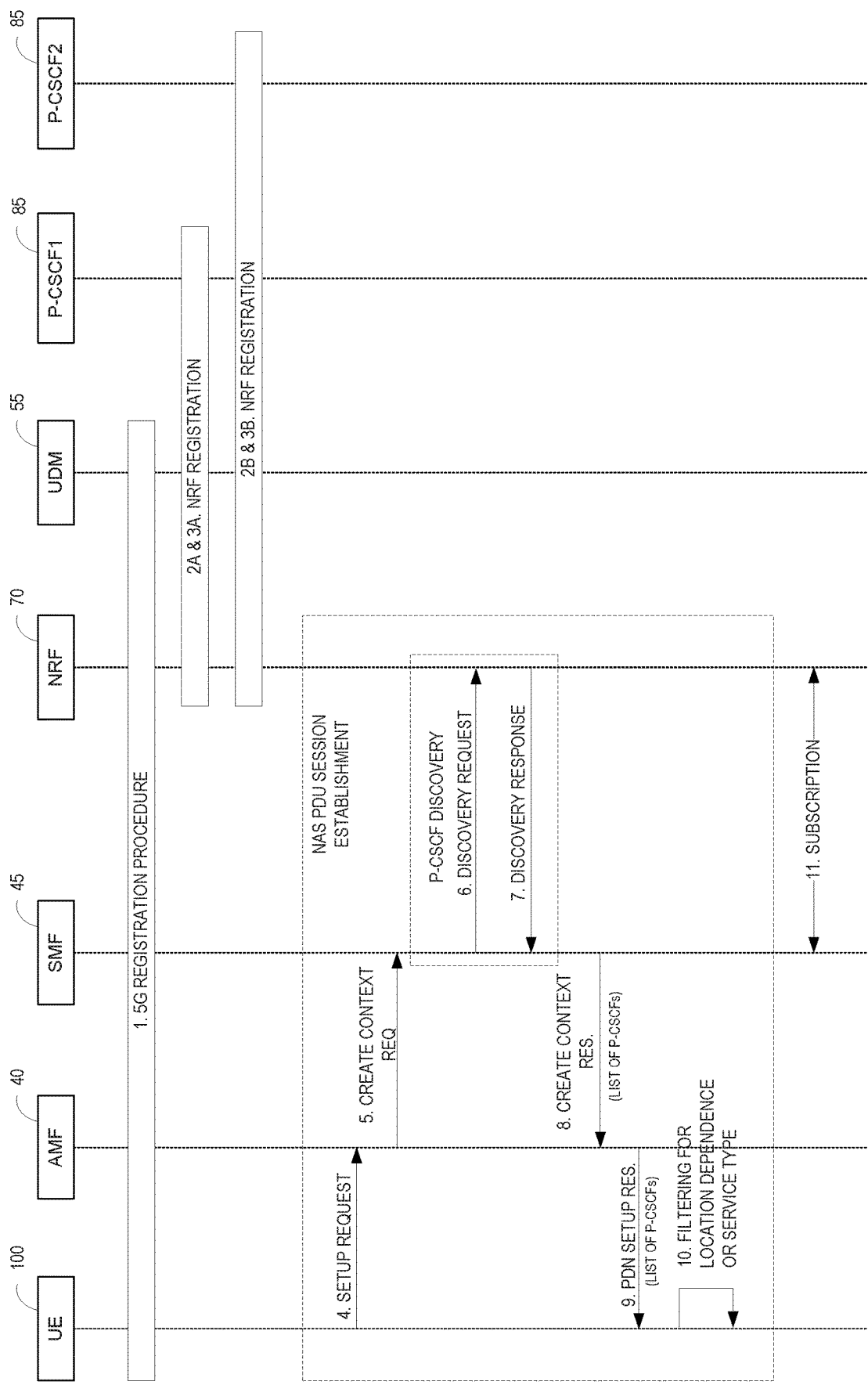
FIG. 4 illustrates another connection establishment procedure that uses a P-CSCF discovery procedure to generate a list of candidate servers.

FIG. 4 shows another connection establishment procedure that incorporates the P-CSCF 85 discovery procedure. In this example, steps 1-9 are the same as shown in FIG. 2, except that the UE 100 does not need to include a type of service or other discovery related information in the PDU setup request. At step 10, the UE 100 filters the list of P-CSCFs to obtain a filtered list of the P-CSCFs 85 that meet a location requirement and/or provide a type of service desired by the UE 100. Filtering for location dependence may be useful to select a P-CSCF for mobile edge computing applications. More generally, the UE 100 may perform filtering based on any filtering criteria. The UE 100 can then select a P-CSCF 85 from the filtered list when it initiates an IMS session or other communication session with the external data network. At step 11, the SMF 45 can optionally subscribe with the NRF 70 to receive updates to the list of P-CSCF 85 returned by the NRF 70, or updates on the status of the P-CSCFs 85 on the list.

Figure 5:
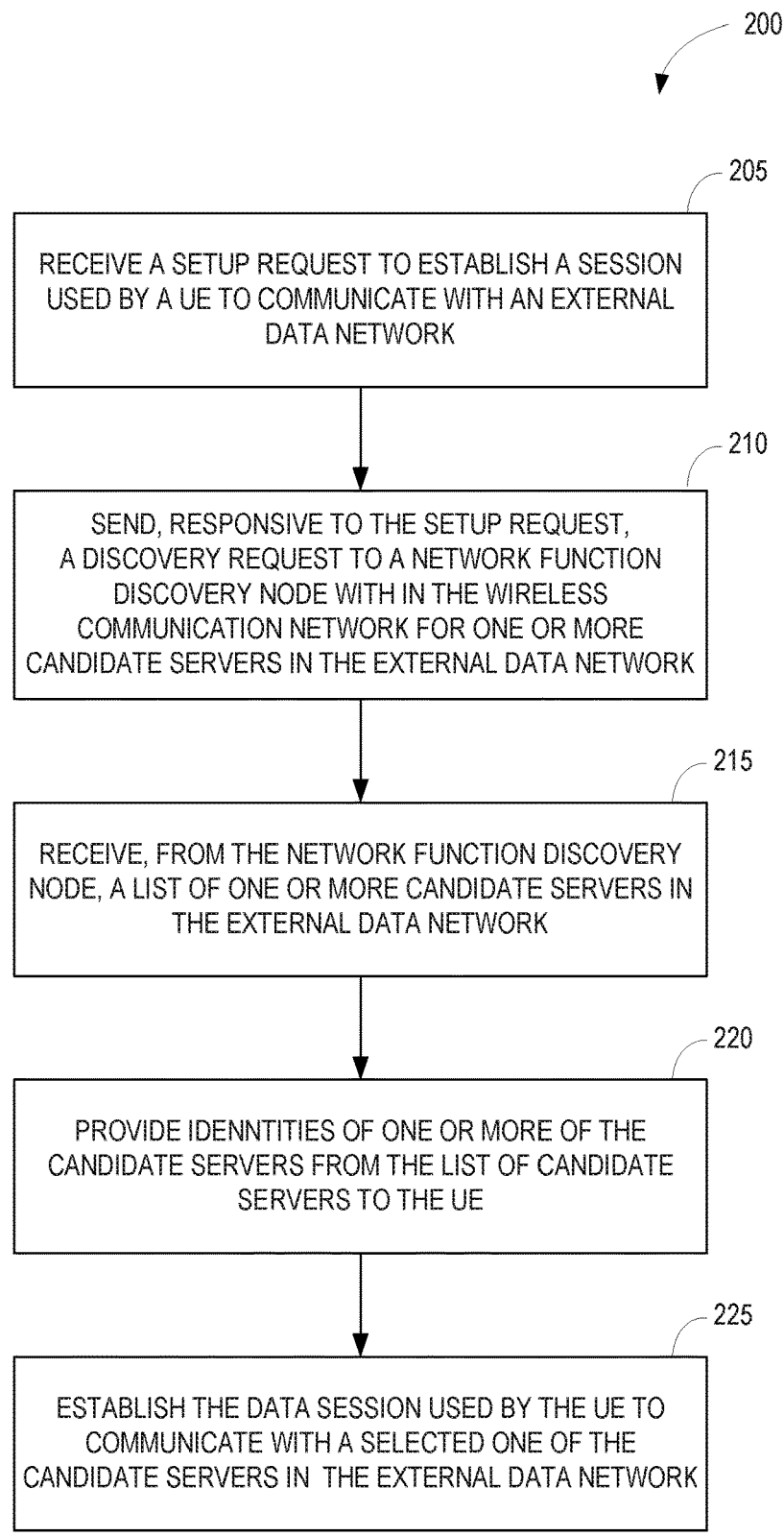
FIG. 5 is a flow diagram illustrating a P-CSCF discovery method performed by a SMF in a wireless communication network.

FIG. 5 illustrates an exemplary method 200 implemented by a SMF 45 in a core network 30. The SMF 45 receives a request to establish a session used by a UE 100 to communicate with an external data network (e.g. IMS) (block 205). Responsive to the request, the SMF 45 sends a discovery request to a NRF 70 or other network function discovery node within the wireless communication network for one or more candidate servers in the external data network (block 210). The SMF 45 receives, responsive to the discovery request, a list of the candidate servers in the external data network from the NRF 70 (block 215). The list of candidate servers returned by the NRF 70 may include, in addition to the identities of the P-CSCFs, any information stored by the NRF 70 such as the services offered by the P-CSCFs and the areas served by the P-CSCFs. The SMF 45 provides the identities (e.g., network addresses or FQDNs) of one or more of the candidate servers from the list to the UE 100 (block 220), and establishes a data session used by the UE 100 to communicate with a selected one of the candidate servers in the external data network (block 225).

In some embodiments of the method 200, providing identities of one or more of the candidate servers from the list of candidate servers comprises forwarding the list of candidate servers to the UE 100. The list of candidate servers provided to the UE 100 may include, in addition to the identities of the P-CSCFs, information such as the services offered by the P-CSCFs and the areas served by the P-CSCFs.

In some embodiments of the method 200, the list of candidate servers provided to the UE 100 by the SMF 45 may be in priority order.

In some embodiments of the method 200, the list of candidate servers provided to the UE 100 by the SMF 45 may include the associated filtering criteria.

In some embodiments of the method 200, the discovery request includes one or more filtering criteria and the list of candidate servers received from the NRF 70 comprises one or more candidate servers filtered according to the filtering criteria.

In some embodiments of the method 200, providing identities of one of more candidate servers from the list of the candidate servers comprises filtering the list of candidate servers received from the NRF 70 based on one or more filtering criteria to generate a filtered list of candidate servers, and forwarding the filtered list of candidate servers to the UE 100.

In some embodiments of the method 200, filtering the list of candidate servers based on one or more filtering criteria comprises filtering the list of candidate servers based on information received in the setup request to establish the session between the UE 100 and the external data network.

Some embodiments of the method 200 further comprise receiving one or more of the filtering criteria in the setup request to establish the session between the UE 100 and the external data network.

The filtering criteria used to carry out the methods 200 may comprise location information and/or a type of service to be carried out by the UE 100 with the external data network. In some embodiments, the location information comprises an identity of at least one of a service area, a tracking area and a cell.

Figure 6:
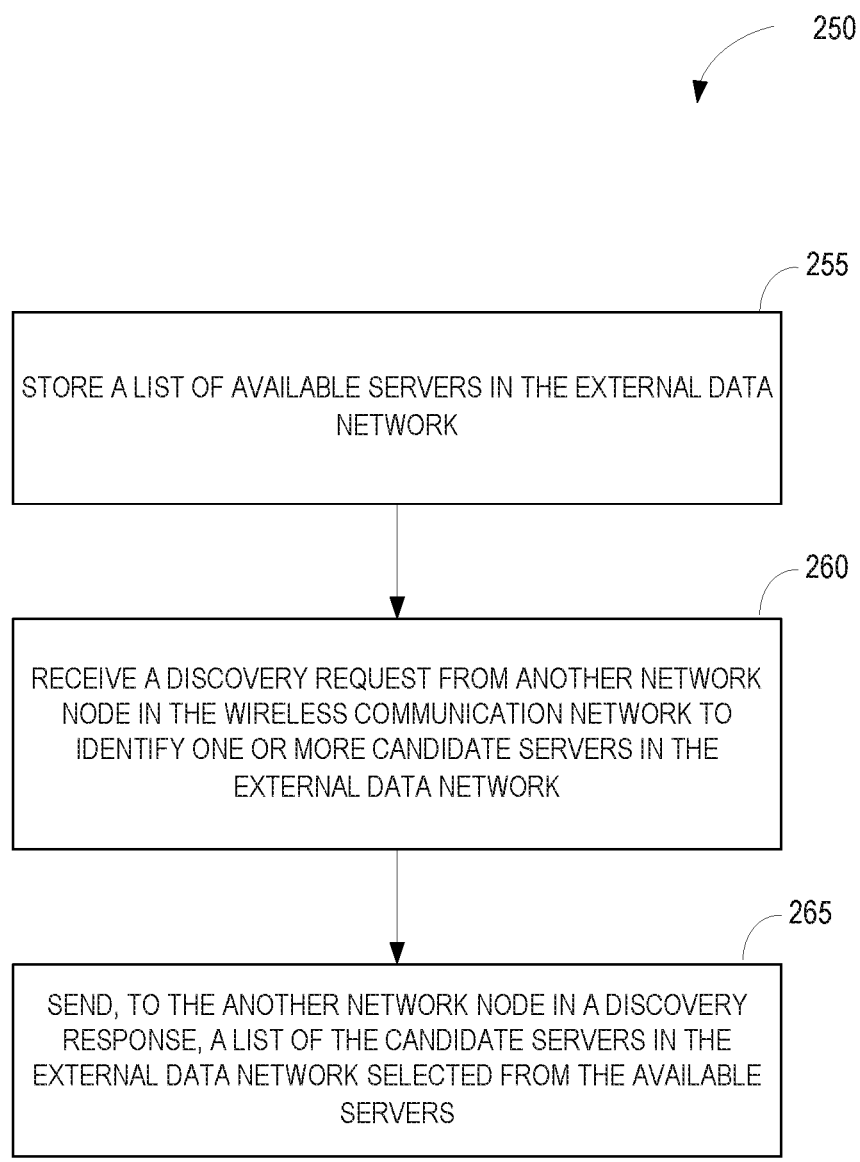
FIG. 6 is a flow diagram illustrating a P-CSCF discovery method performed by a NRF in a wireless communication network.

FIG. 6 illustrates an exemplary method 250 implemented by a NRF 70 in a core network 30. In one embodiment, the NRF 70 stores a list of available servers in the external data network (block 255). The NRF 70 further receives a discovery request from a SMF 45 or other network node in the wireless communication network 10 to identify one or more candidate servers in the external data network (block 260). In response to the discovery request, the NRF 70 sends, to the SMF 45 in a discovery response, a list of the candidate servers in the external data network selected from the available servers (block 265). The list of candidate servers returned by the NRF 70 may include, in addition to the identities of the P-CSCFs, any information stored by the NRF 70 such as the services offered by the P-CSCFs and the areas served by the P-CSCFs.

Some embodiments of the method 250 further comprise receiving, in the discovery request, one or more filtering criteria and filtering the available servers according to the filtering criteria to generate the list of candidate servers.

The filtering criteria used to carry out the methods 250 may comprise location information and/or type of service to be carried out by the UE 100 over the established session with the external data network. In some embodiments, the location information comprises an identify of at least one of a service area, a tracking area and a cell.

Figure 7:
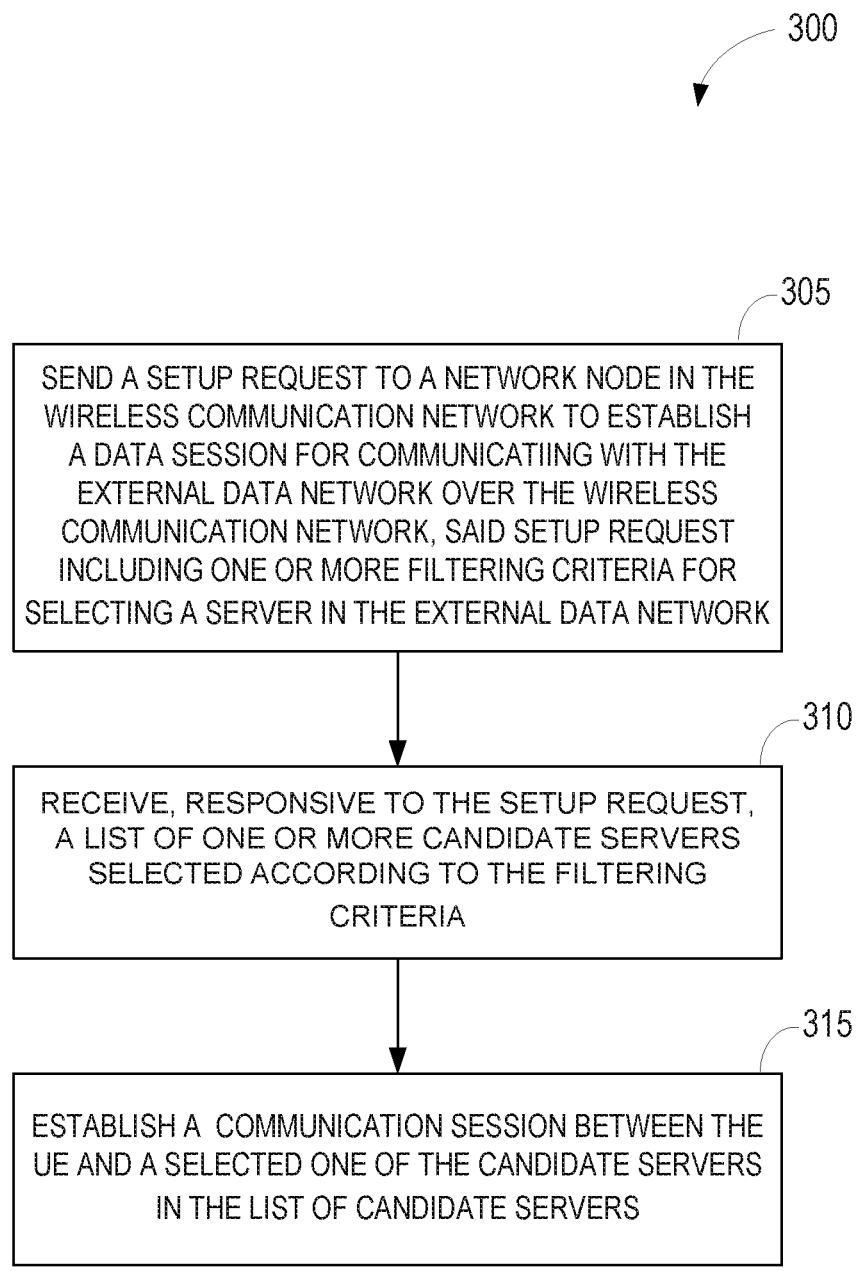
FIG. 7 is a flow diagram illustrating a P-CSCF discovery method performed by a UE in a wireless communication network.

FIG. 7 illustrates an exemplary method 300 implemented by a UE 100 in a wireless communication network 10. The UE 100 sends a setup request for a network node to establish a data session (e.g., PDU session) for communicating with the external data network over the wireless communication network 10 (block 305). The setup request comprises one or more filtering criteria for selecting at least one server in the external data network. Responsive to the setup request, the UE 100 receives a list of one or more candidate servers filtered according to the filtering criteria (block 310). The list of candidate servers received by the UE 100 may include, in addition to the identities of the P-CSCFs, information such as the services offered by the P-CSCFs and the areas served by the P-CSCFs. The UE 100 establishes a communication session (e.g. IMS session) with a selected one of the candidate servers in the list of candidate servers (block 315).

In some embodiments of the method 300, the one or more filtering criteria comprise location information and a type of service that will be carried out by the UE 100 over the established data session with the external data network. The location information may comprise an identity of at least one of a service area, a tracking area and a cell area.

In some embodiments of the method 300, the list of the one or more candidate servers is provided in an order of priority.

Some embodiment of the method 300 further comprise selecting the server from the list of one or more candidates in accordance with the received order of priority.

In some embodiments of the method 300, the list of one or more candidate servers is provided with its associated filter criteria.

Some embodiments of the method 300 further comprise selecting the server from the list of one or more candidates in accordance with the one or more filter criteria.

Figure 8:
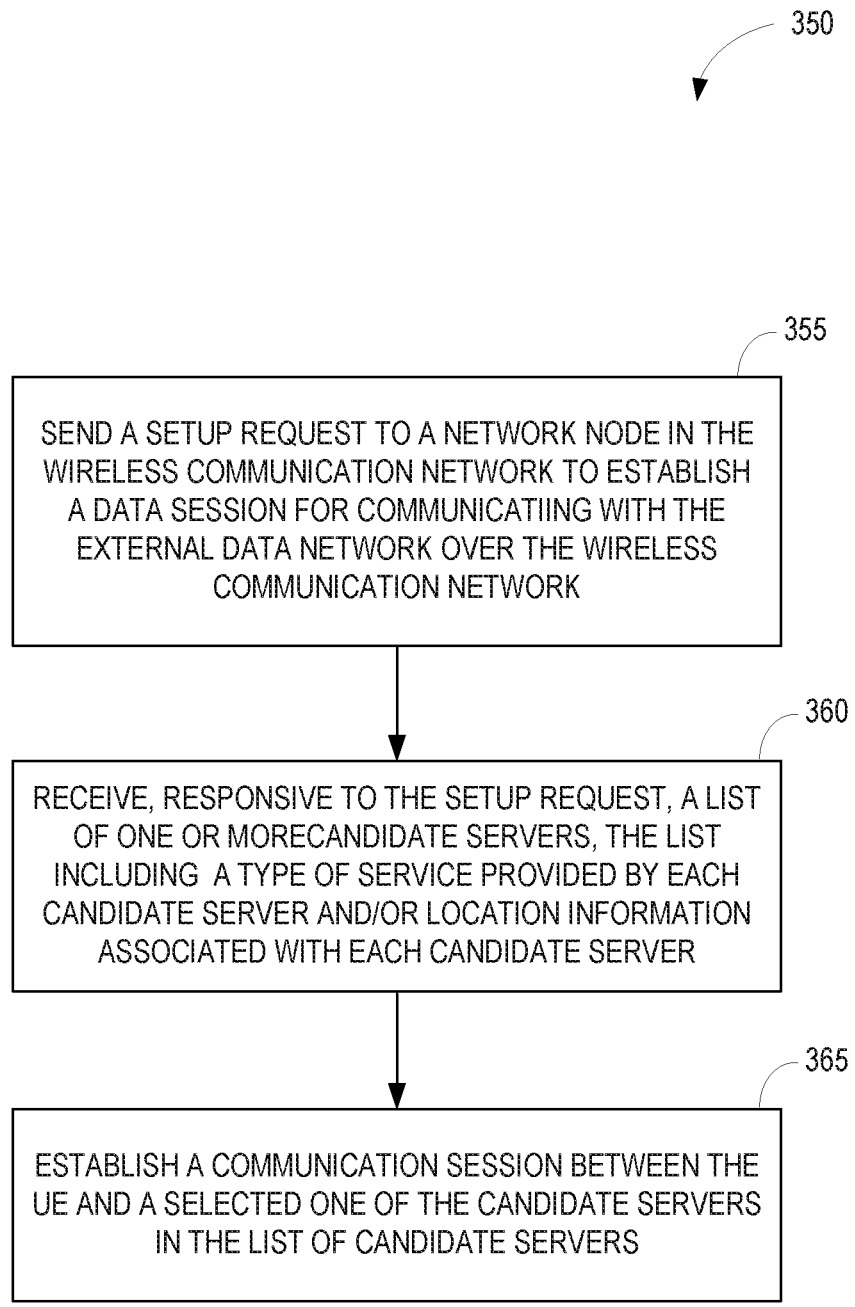
FIG. 8 is another flow diagram illustrating a P-CSCF discovery method performed by a UE in a wireless communication network.

FIG. 8 illustrates an exemplary method 350 implemented by a UE 100 in a wireless communication network 10. The UE 100 sends a setup request to a network node to establish a data session for communicating with the external data network over the wireless communication network (block 355). The UE 100 receives a list of one or more candidate servers in response to the set up request (block 360). The list includes, for each candidate server, a type of service provided by the candidate server and/or location information associated with the candidate server. The UE 100 establishes a communication session with a selected one of the candidate servers the list of candidate servers (block 365).

Some embodiments of the method 350 further comprise selecting the server from the list of one or more candidates in based on the type of service.

Some embodiments of the method 350 further comprise selecting the server from the list of one or more candidates in based on the location information.

In some embodiments of the method 350, the location information comprises an identity of one of a service area, a tracking area, or a cell.

Figure 9:
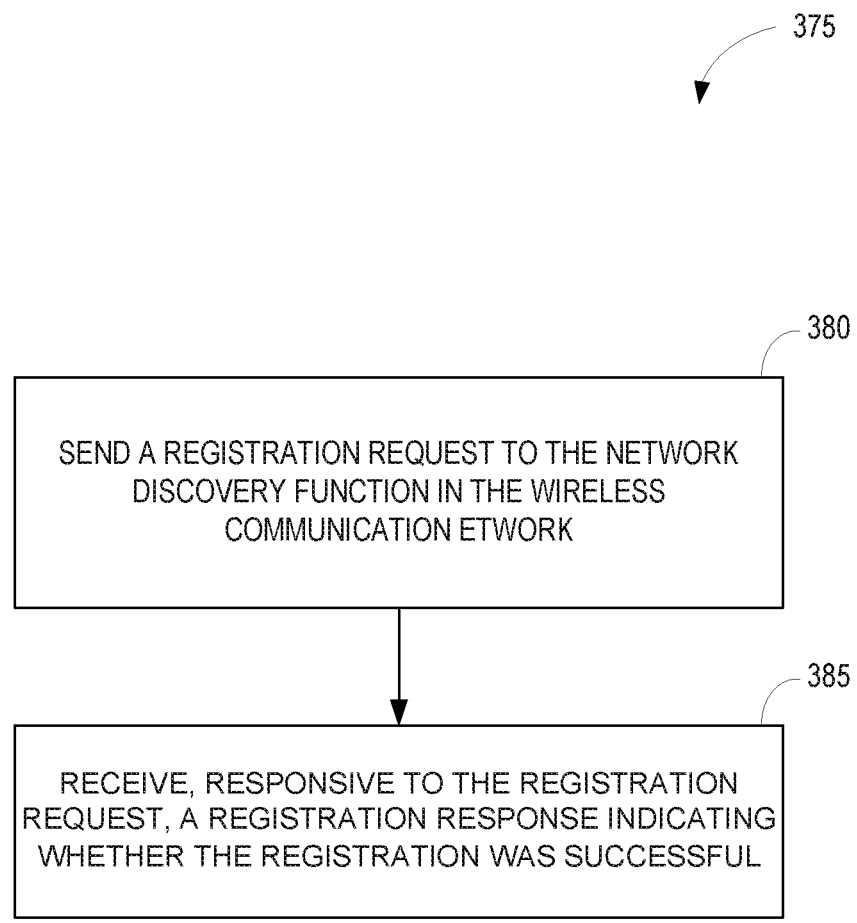
FIG. 9 is a flow diagram illustrating a registration procedure performed by a P-CSCF in a data network to make its services available to UEs in the wireless communication network.

FIG. 9 illustrates an exemplary method 375 implemented by a P-CSCF 85 in the data network to support service-based P-CSCF discovery. The P-CSCF 85 sends a registration request to the NRF 70 or other NF discovery function in the communication wireless network 10 (block 380). The P-CSCF 85 receives, responsive to the registration request, a registration response indicating whether the registration was successful (block 385).

In some embodiments of the method 375, the registration request includes an indication identifying an NF type of the P-CSCF 85.

In other embodiments of the method 375, the registration request may further include, at least one of an address of the P-CSCF 85; an indication of the services supported by the P-CSCF 85; a tracking area served by the P-CSCF 85; or a list of cells served by the P-CSCF 85.

Figure 10:
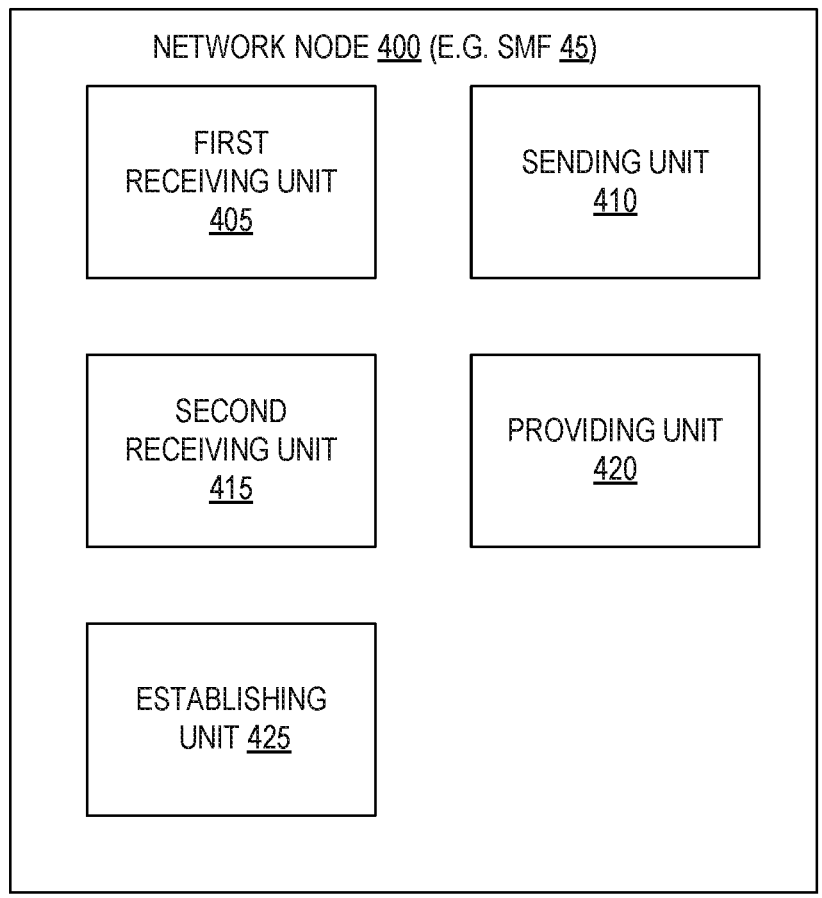
FIG. 10 is a schematic diagram of a network node configured as an SMF according to one embodiment.
Figure 11:
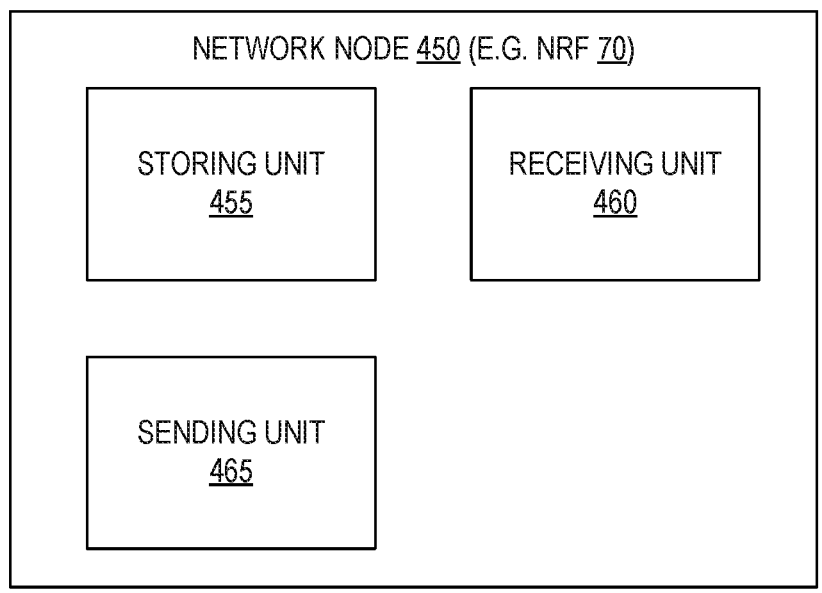
FIG. 11 is a schematic diagram of a network node configured as an NRF according to one embodiment.

FIG. 10 illustrates a network node 400 (e.g., SMF 45) configured to perform the method shown in FIG. 5. The network node 400 comprises a first receiving unit 405, a sending unit 410, a second receiving unit 415, a providing unit 420 and an establishing unit 425. The various units 405-425 can be implemented by hardware and/or by software code that is executed by one or more processors or processing circuits. The first receiving unit 405 is configured to receive a setup request to establish a session used by the UE 100 to communicate with an external data network. The sending unit 410 is configured to send, responsive to the setup request, a discovery request to a NF discovery node (e.g. NRF 70) within the wireless communication network for one or more candidate servers (e.g. P-CSCFs) in the external data network. The second receiving unit 415 is configured to receive, from the NF discovery node, a list of one or more candidate servers in the external data network. The providing unit 420 is configured to provide, to the UE 100, identities of one or more of the candidate servers from the list of candidate servers. The establishing unit 425 is configured to establish the data session used by the UE 100 to communicates with a selected one of the candidate servers in the external data network FIG. 11 illustrates a network node 450 (e.g., NRF 70) configured to perform the method shown in FIG. 6. The network node 400 comprises a storing unit 455, a receiving unit 460 and a sending unit 465. The various units 455-465 can be implemented by hardware and/or by software code that is executed by one or more processors or processing circuits. The storing unit 455 is configured to store a list of available servers (e.g. P-CSCFs) in the external data network. The receiving unit 460 is configured to receive a discovery request from another network node (e.g. SMF 45) in the wireless communication network 10 to identify one or more candidate servers in the external data network. The sending unit 465 is configured to send, to the another network node in a discovery response, a list of the candidate servers in the external data network selected from the available servers.

Figure 12:
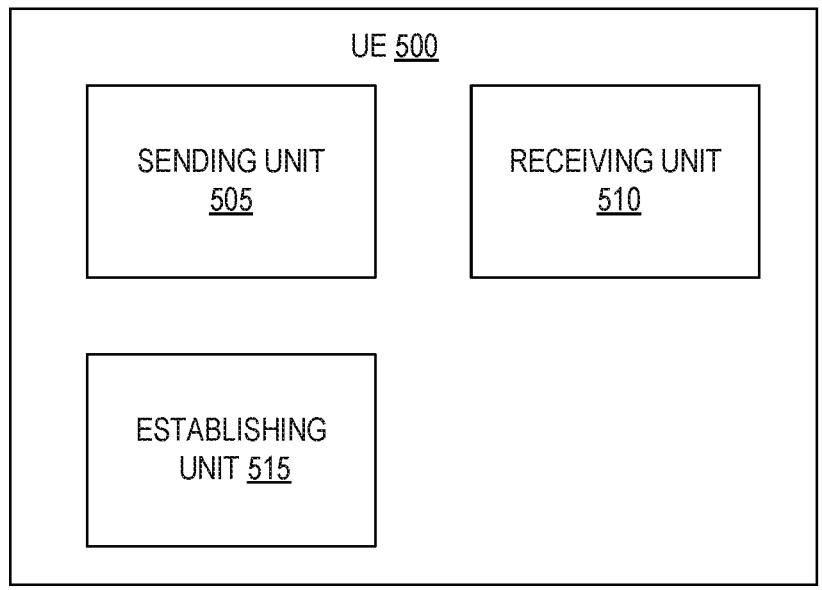
FIG. 12 is a schematic diagram of a UE according to one embodiment.

FIG. 12 illustrates a UE 500 configured to perform the method 300 shown in FIG. 7. The UE 500 comprises a sending unit 505, a receiving unit 510 and an establishing unit 515. The various units 505-515 can be implemented by hardware and/or by software code that is executed by one or more processors or processing circuits. The sending unit 505 is configured to send a setup request for a network node to establish a data session for communicating with the external data network over the wireless communication network 10. The setup request comprises one or more filtering criteria for receiving at least one server in the external data network in accordance with the filtering criteria. The receiving unit 510 is configured to receive a list of one or more candidate servers filtered according to the filtering criteria in response to the setup request. The establishing unit 515 is configured to establish a communication session with a selected one of the candidate servers in the list candidate servers.

Figure 13:
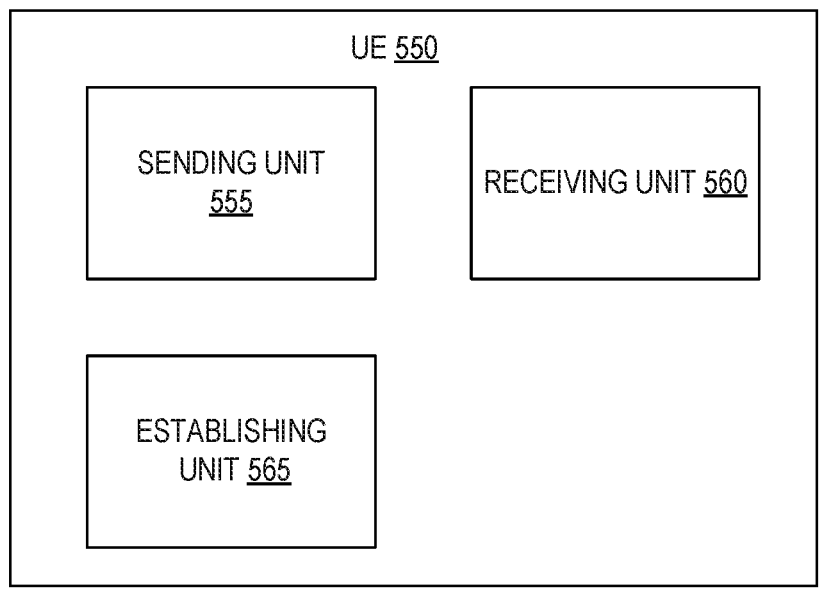
FIG. 13 is a schematic diagram of a UE according to one embodiment.

FIG. 13 illustrates a UE 550 configured to perform the method 350 shown in FIG. 8. The UE 500 comprises a sending unit 555, a receiving unit 560 and an establishing unit 565. The various units 555-565 can be implemented by hardware and/or by software code that is executed by one or more processors or processing circuits. The sending unit 555 is configured to send a setup request to a network node to establish a data session for communicating with the external data network over a wireless communication network 10. The receiving unit 560 is configured to receive a list of one or more candidate servers in response to the set up request. The list of candidate servers includes a type of service provided by each candidate server and/or location information associated with each candidate server. The establishing unit 565 is configured to establish a communication session with a selected one of the candidate servers in the list of candidate servers. The sending unit 555, a receiving unit 560 and an establishing unit 565.

Figure 14:
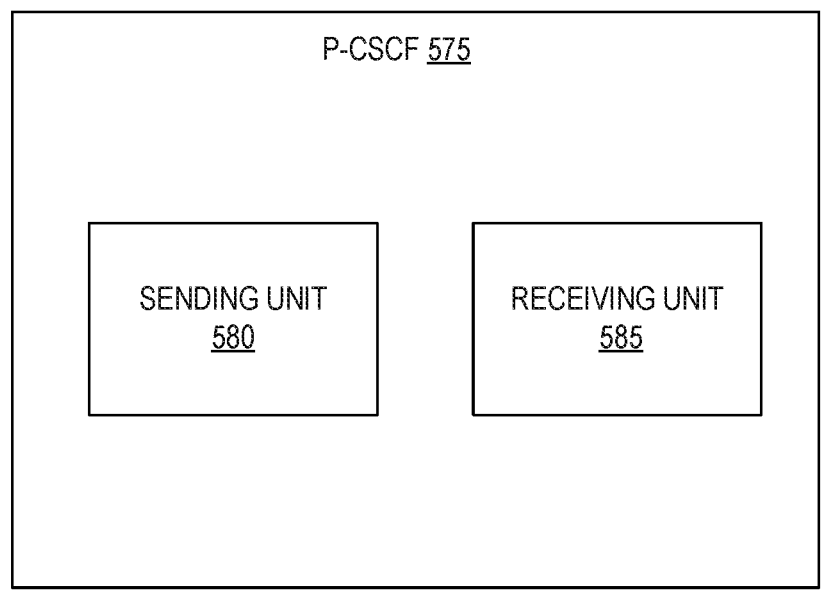
FIG. 14 is a schematic diagram of a server in an external data network according to one embodiment

FIG. 14 illustrates a P-CSCF 575 in a data network 80 that is configured to provide services to UEs 100 in a wireless communication network 10. The P-CSCF 575 comprises a sending unit 580 and a receiving unit 585. The units 580 and 585 can be implemented by hardware and/or by software code that is executed by one or more processors or processing circuits. The sending unit 580 is configured to send a registration request to the NRF 70 in the wireless communication network 10. The receiving unit 585 is configured to receive, responsive to the registration request, a registration response indicating whether the registration was successful.

Figure 15:
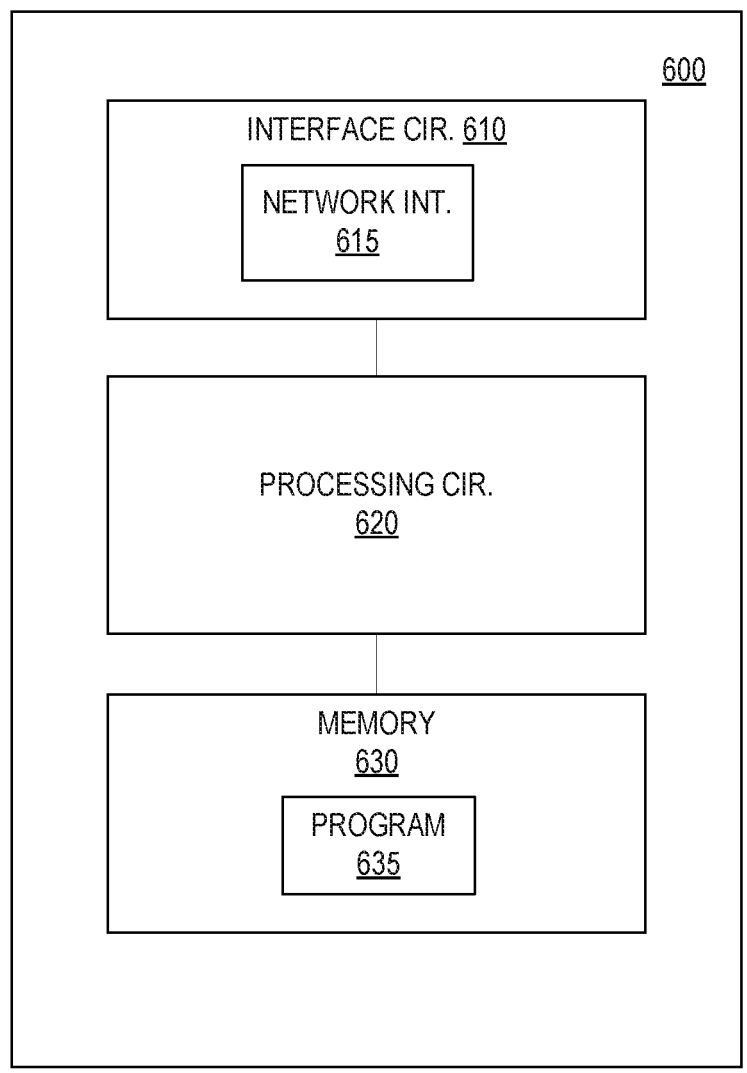
FIG. 15 is a functional block diagram of a network node according to another embodiment.

FIG. 15 is a block diagram showing the main functional components of a network node according to one embodiment. The network node 600 may be configured to perform the functions of an SMF 45 or NRF 70 as herein described. The network node 600 comprises an interface circuit 610, a processing circuit 620, and a memory 630. The interface circuit 610 provides a network interface for communicating over wired and/or wireless networks with other core network nodes and/or network nodes in external data networks. The processing circuit 620 processes signals transmitted and received by the network node 600, and controls the operation of the network node 600. The processing circuit 620 may comprise one or more microprocessors, hardware, firmware, or a combination thereof. The processing circuit 620 may be configured by software to perform any of the procedures shown in FIGS. 2-4 and the methods 200 and 250 shown in FIGS. 5 and 6.

Memory 630 comprises both volatile and non-volatile memory for storing computer program code and data needed by the processing circuit 620 for operation. Memory 630 may comprise any tangible, non-transitory computer-readable storage medium for storing data including electronic, magnetic, optical, electromagnetic, or semiconductor data storage. Memory 630 stores a computer program 635 comprising executable instructions that configure the processing circuit 620 to implement the methods and procedures described herein including the methods according to FIGS. 2-4 and the methods 200 and 250 shown in FIGS. 5 and 6, respectively. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, computer program 635 for configuring the processing circuit 620 as herein described may be stored in a removable memory, such as a portable compact disc, portable digital video disc, or other removable media. The computer program 635 may also be embodied in a carrier such as an electronic signal, optical signal, radio signal, or computer readable storage medium.

Figure 16:
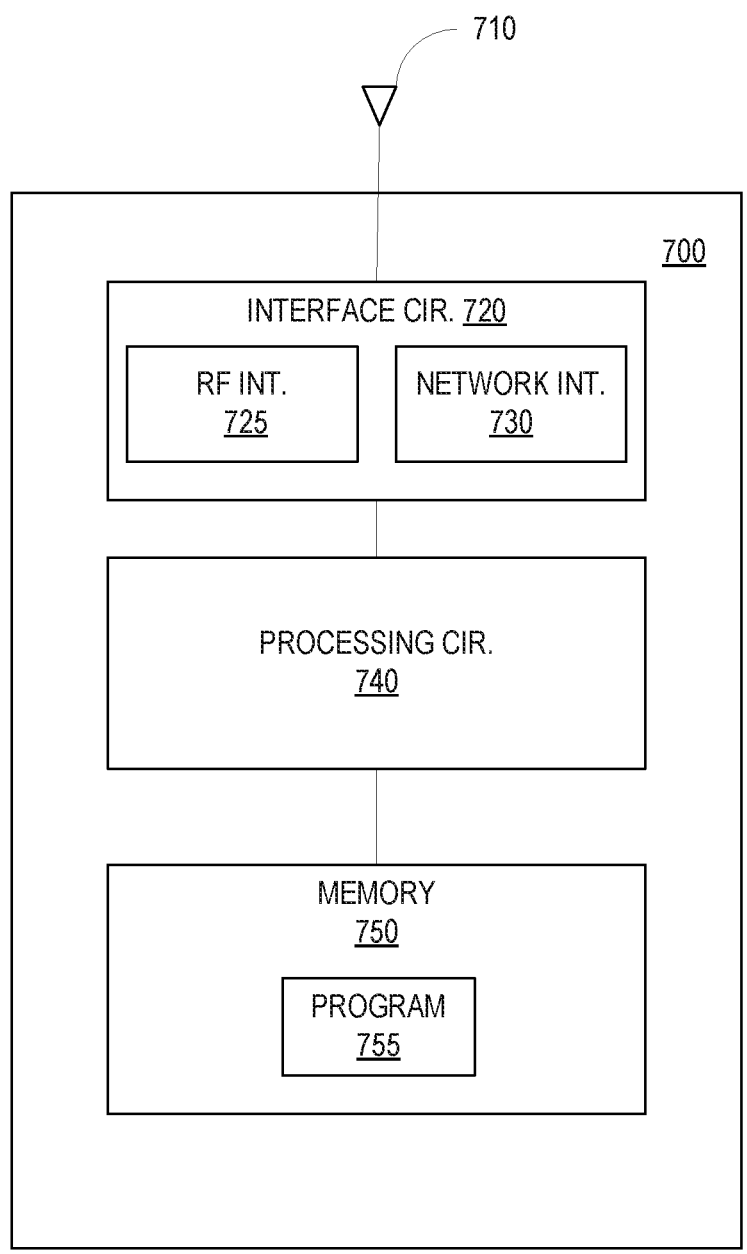
FIG. 16 is a functional block diagram of a UE according to another embodiment.

FIG. 16 illustrates the main functional components of UE 700 configured to implement the methods as herein described. The UE 700 comprises an interface circuit 720, a processing circuit 740, and a memory 750. The interface circuit 720 includes the RF components needed for communicating with base station 25 in the wireless communication network 10. Typically, the RF components include a transmit circuit 725 and a receive circuit 730 operatively connected to one or more antenna 710 and adapted for communications according to the 4G and 5G standards.

The processing circuit 740 processes the signals transmitted to or received by the UE 100 700, and controls the operation of the UE 700. The processing circuit 740 may comprise one or more microprocessors, hardware, firmware, or a combination thereof. The processing circuit 740 may be configured by software to perform the procedure shown in FIGS. 2-4 and/or the methods 300 and 350 shown in FIGS. 7 and 8, respectively.

Memory 750 comprises both volatile and non-volatile memory for storing computer program code and data needed by the processing circuit 740 for operation. Memory 750 may comprise any tangible, non-transitory computer-readable storage medium for storing data including electronic, magnetic, optical, electromagnetic, or semiconductor data storage. Memory 750 stores a computer program 755 comprising executable instructions that configure the processing circuit 740 to implement the methods and procedures described herein including the procedures methods according to FIGS. 2-4 and methods 300 and 350 according to FIGS. 7 and 8, respectively. In general, computer program instructions are stored in a non-volatile memory, such as a ROM, EPROM or flash memory. Temporary data generated during operation may be stored in a volatile memory, such as a RAM. In some embodiments, computer program 755 for configuring the processing circuit 740 as herein described may be stored in a removable memory, such as a portable compact disc, portable digital video disc, or other removable media. The computer program 755 may also be embodied in a carrier such as an electronic signal, optical signal, radio signal, or computer readable storage medium.

Figure 17:
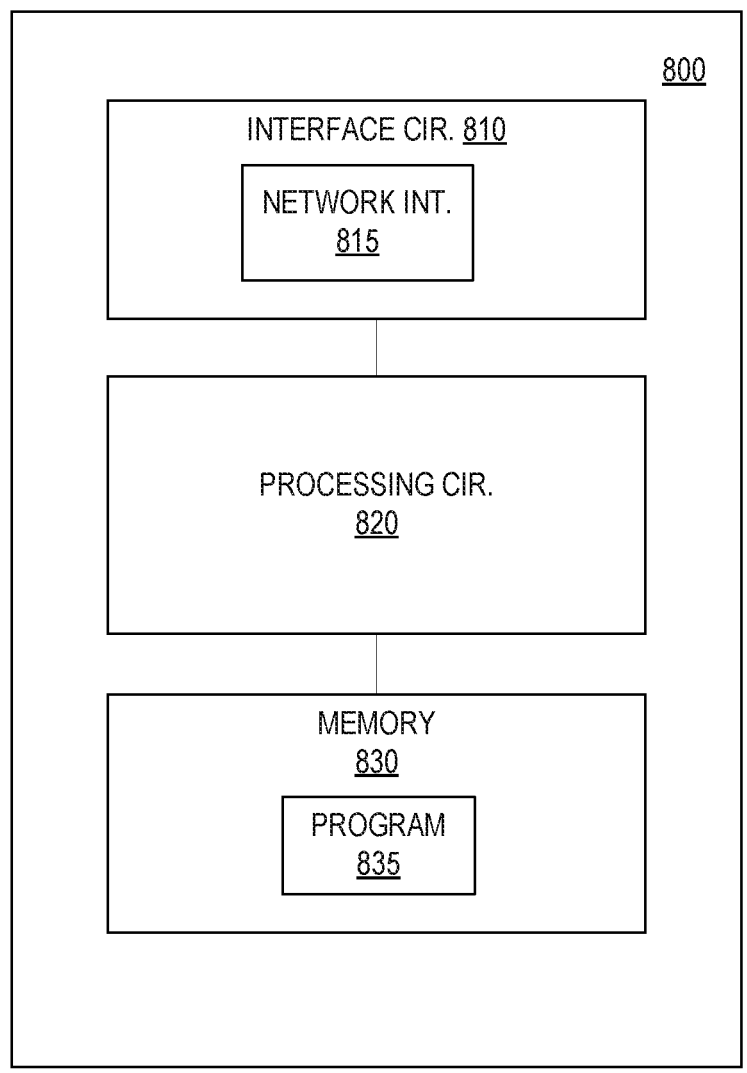
FIG. 17 is a functional block diagram of a P-CSCF in a data network according to another embodiment.

FIG. 17 illustrates the main functional components of a P-CSCF 800 in an external data network 80 that is configured to provide services to UEs 100 in a wireless communication network 10. The P-CSCF 800 may be configured to perform the functions of a P-CSCF 85 as herein described. The P-CSCF 800 comprises an interface circuit 810, a processing circuit 820, and a memory 830. The interface circuit 810 provides a network interface for communicating over wired and/or wireless networks with network nodes in the wireless communication network 10. The processing circuit 820 processes signals transmitted and received by the server 700, and controls the operation of the P-CSCF 800. The processing circuit 820 may comprise one or more microprocessors, hardware, firmware, or a combination thereof. The processing circuit 820 may be configured by software to perform any of the procedures shown in FIGS. 2-4 and the method 375 shown in FIG. 9.

Memory 830 comprises both volatile and non-volatile memory for storing computer program code and data needed by the processing circuit 820 for operation. Memory 830 may comprise any tangible, non-transitory computer-readable storage medium for storing data including electronic, magnetic, optical, electromagnetic, or semiconductor data storage. Memory 830 stores a computer program 835 comprising executable instructions that configure the processing circuit 820 to implement the methods and procedures described herein including the methods according to FIGS. 2-4 and the method 375 shown in FIG. 9. In general, computer program instructions and configuration information are stored in a non-volatile memory, such as a read only memory (ROM), erasable programmable read only memory (EPROM) or flash memory. Temporary data generated during operation may be stored in a volatile memory, such as a random access memory (RAM). In some embodiments, computer program 835 for configuring the processing circuit 820 as herein described may be stored in a removable memory, such as a portable compact disc, portable digital video disc, or other removable media. The computer program 835 may also be embodied in a carrier such as an electronic signal, optical signal, radio signal, or computer readable storage medium.

What is claimed is:

1. A method, implemented by a network node in a wireless communication network, the method comprising:
   receiving a setup request to establish a data session used by a user equipment to communicate with an external data network;
   sending, responsive to the setup request, a discovery request to a network function discovery node within the wireless communication network for one or more candidate servers in the external data network;
   receiving, from the network function discovery node, a list of one or more candidate servers in the external data network;
   providing, to the user equipment, identities of one or more of the candidate servers from the list of candidate servers; and
   establishing the data session used by the user equipment to communicate with a selected one of the candidate servers in the external data network.

2. The method of claim 1, wherein providing identities of one or more of the candidate servers from the list of candidate servers comprises forwarding the list of candidate servers to the user equipment.

3. The method of claim 1, wherein the discovery request includes one or more filtering criteria; and wherein the list of candidate servers received from the network function discovery node comprises one or more candidate servers filtered according to the filtering criteria.

4. The method of claim 1, wherein providing identities of one of more candidate servers from the list of the candidate servers comprises:
   filtering the list of candidate servers received from the network function discovery node based on one or more filtering criteria to generate a filtered list of candidate servers; and
   forwarding the filtered list of candidate servers to the user equipment.

5. The method of claim 4, wherein filtering the list of candidate servers based on one or more filtering criteria comprises filtering the list of candidate servers based on information received in the setup request, wherein the information is related to the one or more filtering criteria.

6. The method of claim 4, further comprising receiving one or more of the filtering criteria in the setup request.

7. The method of claim 3, wherein the filtering criteria comprises: location information and/or a type of service to be carried out by the user equipment over the established session with the external data network.

8. The method of claim 7, wherein the location information comprises an identity of a service area, a tracking area, and/or a cell.

9. A method, implemented by a network node in a wireless communication network, the method comprising:
   storing a list of available servers in an external data network;
   receiving a discovery request from another network node in the wireless communication network to identify one or more candidate servers in the external data network; and
   sending, to the another network node and in a discovery response, a list of the candidate servers in the external data network selected from the available servers.

10. The method of claim 9, further comprising:
  receiving, in the discovery request, one or more filtering criteria; and
  filtering the available servers according to the filtering criteria to generate the list of candidate servers.

11. The method of claim 9, wherein the filtering criteria comprises location information and/or a type of service to be carried out by the user equipment over the established session with the external data network.

12. The method of claim 11, wherein the location information comprises an identity of a service area, a tracking area, and/or a cell.

13. A method, implemented by a user equipment in a wireless communication, the method comprising:
  sending a setup request to a network node in the wireless communication network to establish a data session for communicating with an external data network over the wireless communication network, the setup request comprising one or more filtering criteria for selecting a server in the external data network;
  receiving, in response to the discovery request, a list of one or more candidate servers filtered according to the filtering criteria; and
  establishing a communication session with a selected server from the one or more candidate servers in the list.

14. The method of claim 13, wherein the one or more filtering criteria comprise location information and/or a type of service that will be carried out by the user equipment over the established data session with the external data network.

15. The method of claim 14, wherein the location information comprises identity of a service area, a tracking area, and/or a cell.

16. The method of claim 13, wherein the list of the one or more candidate servers is provided in an order of priority.

17. The method of claim 16, further comprising selecting the server from the list of one or more candidates in accordance with the received order of priority.

18. The method of claim 13, wherein the list of one or more candidate servers is provided with its associated filter criteria.

19. The method of claim 18, further comprising selecting the server from the list of one or more candidates in accordance with the one or more filter criteria.

20. A method, implemented by a user equipment in a wireless communication network, the method comprising:
  sending a setup request to a network node in the wireless communication network to establish a data session for communicating with an external data network over the wireless communication network;
  receiving a list of one or more candidate servers in response to the set up request; the list including, for each candidate server, a type of service provided by the candidate server and/or location information identifying an area supported by the candidate server; and
  establishing a communication session with a selected server from the one or more candidate servers in the list.

21. The method of claim 20, further comprising selecting the server from the list of one or more candidates in based on the type of service.

22. The method of claim 20, further comprising selecting the server from the list of one or more candidates based on the location information.

23. The method of claim 22, wherein the location information comprises an identity of a service area, a tracking area, and/or a cell.

\* \* \* \* \*